United States Patent [19]

Sumi

[11] Patent Number: 4,530,338
[45] Date of Patent: Jul. 23, 1985

[54] SUPERCHARGER FOR AN ENGINE WITH AN ENGINE-POWERED AUXILIARY DEVICE

[75] Inventor: Yasuo Sumi, Zushi, Japan

[73] Assignee: Nissan Motor Company, Limited, Yokohama, Japan

[21] Appl. No.: 469,415

[22] Filed: Feb. 24, 1983

[30] Foreign Application Priority Data

Mar. 26, 1982 [JP] Japan ............................ 57-42662[U]

[51] Int. Cl.³ ............................................. F02B 33/36
[52] U.S. Cl. .................................. 123/559; 62/323.4; 123/198 R
[58] Field of Search ............... 62/133, 323.4; 123/559, 123/564, 198 R

[56] References Cited

U.S. PATENT DOCUMENTS

| | | |
|---|---|---|
| 3,673,797 | 7/1972 | Wilkinson . |
| 4,350,135 | 9/1982 | Casey et al. ........................ 123/564 |
| 4,391,242 | 7/1983 | Mashio .......................... 62/323.4 X |
| 4,460,056 | 7/1984 | Jaccod ....................... 123/198 R X |

FOREIGN PATENT DOCUMENTS 2926426 1/1981 Fed. Rep. of Germany .
1013437 7/1952 France .
225229 1/1943 Switzerland .

OTHER PUBLICATIONS

J. Buike et al., "Supercharging for Fuel Economy", SAE Paper 810006 (1981).

Primary Examiner—Michael Koczo
Attorney, Agent, or Firm—Lane, Aitken & Kananen

[57] ABSTRACT

A supercharger is applied to the combination of an engine, an air intake passage through which air is conducted to the engine, and an auxiliary device connectable to the engine to be driven by the engine. The supercharger includes a compressor disposed in the air intake passage to compress air conducted to the engine. The compressor is connectable to the engine to be driven by the engine. A sensor is provided to sense whether or not the power output required of the engine is higher than a predetermined level. A first clutch responsive to the sensor disconnects the compressor from the engine when the power output required of the engine is not higher than the predetermined level. A second clutch responsive to the sensor disconnects the auxiliary device from the engine when the power output required of the engine is higher than the predetermined level.

2 Claims, 4 Drawing Figures

4,530,338

SUPERCHARGER FOR AN ENGINE WITH AN ENGINE-POWERED AUXILIARY DEVICE

BACKGROUND OF THE INVENTION

1. Field of the Invention

This invention relates to a supercharger for an engine which is coupled to the engine by means of a mechanical drive arrangement to be powered by the engine. More specifically, it relates to a control system for the supercharger applied to the combination of the engine and an engine-powered auxiliary device.

2. Description of the Prior Art

Superchargers are sometimes applied to internal combustion engines to supply the engines with a greater amount of air-fuel mixture per stroke order to increase the power output of the engines. The supercharger includes a compressor disposed in the air intake passage of the engine to compress the intake air or air-fuel mixture supplied to the engine cylinders. In this case, the compressor is mechanically connected to the engine output shaft to be powered by the engine.

SAE paper 810006 discloses a control system for a supercharger which includes a clutch provided in the connection between the engine and the compressor to selectively effect and interrupt transmission of engine power output to the compressor. The control system also includes an accelerator pedal switch designed to control engagement and disengagement of the clutch. When the power output required of the engine exceeds a predetermined level, the clutch is engaged to operate the compressor to increase the actual engine power output. While the power output required of the engine is lower than the predetermined level, the clutch remains disengaged to reduce the engine load.

SUMMARY OF THE INVENTION

It is an object of this invention to provide a supercharger which can quickly respond to engine-power increase requirements.

In accordance with this invention, a supercharger is applied to the combination of an engine, an air intake passage through which air is conducted to the engine, and an auxiliary device connectable to the engine to be driven by the engine. The supercharger includes a compressor disposed in the air intake passage to compress air conducted to the engine. The compressor is connectable to the engine to be driven by the engine. A sensor is provided to sense whether or not the power output required of the engine is higher than a predetermined level. A first clutch responsive to the sensor disconnects the compressor from the engine when the power output required of the engine is not higher than the predetermined level. A second clutch responsive to the sensor disconnects the auxiliary device from the engine when the power output required of the engine is higher than the predetermined level.

The above and other objects, features and advantages of this invention will be apparent from the following description of preferred embodiments thereof, taken in conjunction with the drawings.

BRIEF DESCRIPTION OF THE DRAWINGS

Like or same elements are denoted by like or same numerals throughout the drawings.

DESCRIPTION OF THE PREFERRED EMBODIMENTS

Figure 1:
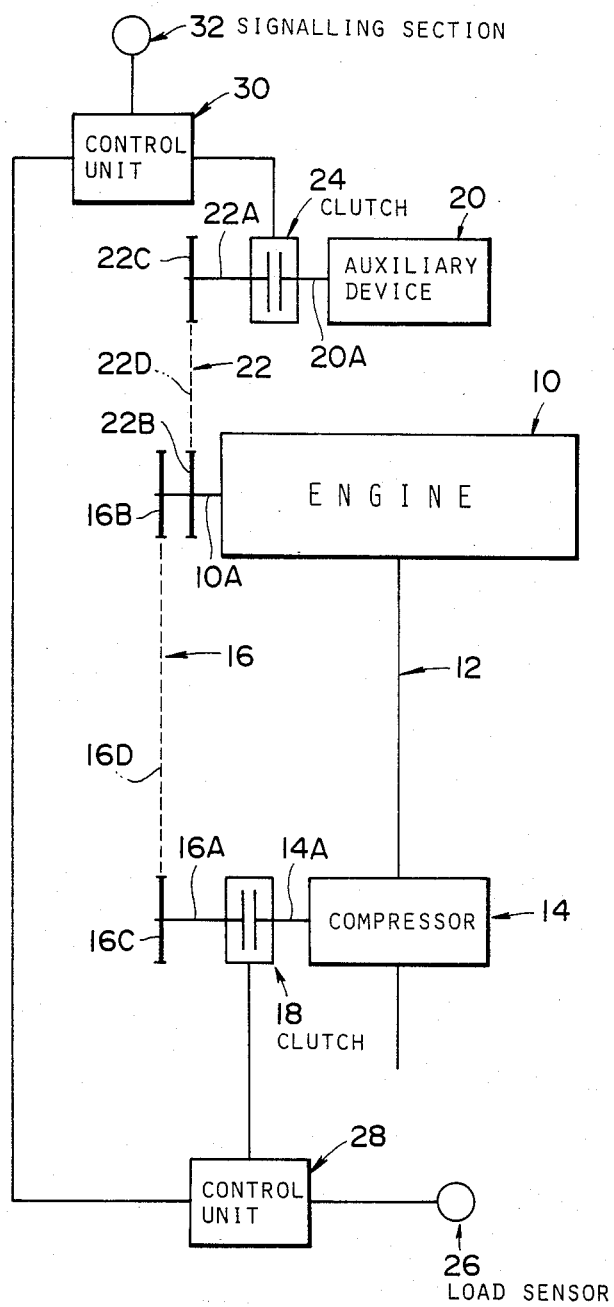
FIG. 1 is a diagram of a supercharger for an internal combustion engine according to a first embodiment of this invention.

With reference to FIG. 1 showing a first embodiment of this invention, an internal combustion engine 10 is provided with an air intake passage 12 which leads to cylinders or combustion chambers of the engine 10 to conduct air or air-fuel mixture to the combustion chambers. A compressor 14 is disposed in the air passage 12 to compress the air or air-fuel mixture supplied to the combustion chambers, for the purpose of supercharging the engine 10. A power transmission or drive train 16 couples the output shaft or crankshaft 10A of the engine 10 to the drive shaft 14A of the compressor 14 in order to transmit the driving force from the engine 10 to the compressor 14. The connection of the power transmission 16 to the drive shaft 14A of the compressor 14 is provided with an electromagnetic or electrically-driven clutch 18 to selectively effect and interrupt the transmission of the driving force from the engine 10 to the compressor 14. In other words, the electromagnetic clutch 18 selectively connects the crankshaft 10A of the engine 10 to the drive shaft 14A of the compressor 14 and disconnects the drive shaft 14A of the compressor 14 from the crankshaft 10A of the engine 10. The electromagnetic clutch 18 is normally in a disengaging position. Therefore, the electromagnetic clutch 18 effects and interrupts the transmission of the driving force when the electromagnetic clutch 18 is energized and de-energized, respectively.

The drive train 16 includes a rotatable shaft 16A, sprockets 16B and 16C, and a chain 16D engaging both of the sprockets 16B and 16C. The first sprocket 16B is mounted on the crankshaft 10A of the engine 10. The second sprocket 16C is mounted on the rotatable shaft 16A. The rotatable shaft 16A rotates as the crankshaft 10A rotates, since torque is transmitted from the crankshaft 10A to the rotatable shaft 16A via the combination of the chain 16D and the sprockets 16B and 16C. The electromagnetic clutch 18 is provided between the rotatable shaft 16A and the drive shaft 14A of the compressor 14 to selectively couple the drive shaft 14A with the rotatable shaft 16A and disconnect the drive shaft 14A from the rotatable shaft 16A. The drive train 16 may also be of other types, for example, including gears or the combination of a belt and pulleys.

An auxiliary device 20, such as an air-conditioner compressor, an alternator, or an engine coolant circulating pump, is also driven by the engine 10. A power transmission or drive train 22 couples the crankshaft 10A of the engine 10 to the drive shaft 20A of the auxiliary device 20 in order to transmit the driving force from the engine 10 to the auxiliary device 20. The connection of the power transmission 22 to the drive shaft 20A of the auxiliary device 20 is provided with an electromagnetic or electrically-driven clutch 24 to selectively effect and interrupt the transmission of the driving force from the engine 10 to the auxiliary device 20. In other words, the electromagnetic clutch 24 selectively connects the crankshaft 10A of the engine 10 to the drive shaft 20A of the auxiliary device 20 and disconnects the drive shaft 20A of the auxiliary device 20 from the crankshaft 10A of the engine 10. The electromagnetic clutch 24 is normally in a disengaging position. Therefore, the electromagnetic clutch 24 effects and interrupts the transmission of the driving force when the electromagnetic clutch 24 is energized and de-energized, respectively.

The drive train 22 includes a rotatable shaft 22A, sprockets 22B and 22C, and a chain 22D engaging both of the sprockets 22B and 22C. The first sprocket 22B is mounted on the crankshaft 10A of the engine 10. The second sprocket 22C is mounted on the rotatable shaft 22A. The rotatable shaft 22A rotates as the crankshaft 10A rotates, since torque is transmitted from the crankshaft 10A to the rotatable shaft 22A via the combination of the chain 22D and the sprockets 22B and 22C. The electromagnetic clutch 24 is provided between the rotatable shaft 22A and the drive shaft 20A of the auxiliary device 20 to selectively couple the drive shaft 20A with the rotatable shaft 22A and disconnect the drive shaft 20A from the rotatable shaft 22A. The drive train 22 may also be of other types, for example, including gears or the combination of a belt and pulleys.

An engine load sensor 26 is provided to detect whether or not the power output required of the engine 10 representing the engine load exceeds a predetermined level. The load sensor 26 consists of a known switch which is actuated by the accelerator pedal controlling the actual power output of the engine 10. In this case, the accelerator pedal switch 26 is designed so as to be closed when the degree of depression of the accelerator pedal exceeds a predetermined level and be opened otherwise. The load sensor 26 may also be some other known switch responsive to the intake manifold vacuum of the engine 10 or the degree of opening of the throttle valve of the engine 10.

A main control unit 28 is electrically connected to the load sensor 26 and the electromagnetic clutch 18 to control the electromagnetic clutch 18 in accordance with the engine load, that is, the power output required of the engine 10. The main control unit 28 is electrically connected to the other electromagnetic clutch 24 via an auxiliary control unit 30 to control the electromagnetic clutch 24 in accordance with the engine load, that is, the power required of the engine 10.

The electromagnetic clutch 24 is also controlled via the auxiliary control unit 30 in accordance with some other condition, such as the temperature of the air space to be air-conditioned or the required air-conditioner ON/OFF selection in the case where the auxiliary device 20 consists of the air-conditioner compressor. A signalling section 32 is electrically connected to the auxiliary control unit 30. The signalling section 32 includes an auxiliary-device ON/OFF or control switch. The combination of the signalling section 32 and the auxiliary control unit 30 is designed so as to control the electromagnetic clutch 24 in accordance with the above-mentioned parameters.

Figure 2:
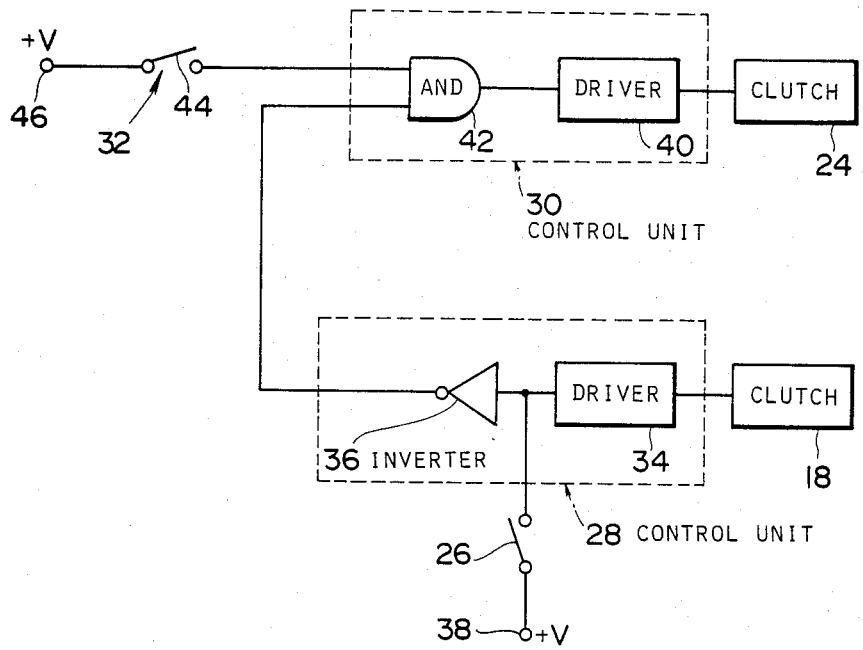
FIG. 2 is a diagram of the electrical components of the supercharger of FIG. 1.

FIG. 2 is an schematic diagram of the circuit of the electromagnetic clutches 18 and 24, the accelerator pedal switch 26, the main control unit 28, the auxiliary control unit 30, and the signalling section 32. The main control unit 28 includes a driver or D.C. amplifier 34 and an inverter 36. The input terminal of the driver 34 is connected, via the accelerator pedal switch 26, to a terminal 38 to which a fixed positive voltage +V is applied. The output terminal of the driver 34 is electrically connected to the electromagnetic clutch 18 to energize the latter. When the accelerator pedal switch 26 is closed, the voltage +V is applied to the input terminal of the driver 34 so that the driver 34 supplies an electric power to the clutch 18 to energize the latter. When the accelerator pedal switch 26 is opened, zero or no voltage is applied to the input terminal of the driver 34 so that the driver 34 supplies no electric power to the clutch 18 to de-energize the latter. The input terminal of the inverter 36 is also connected, via the accelerator pedal switch 26, to the terminal 38. When the accelerator pedal switch 26 is closed, the voltage +V is applied to the input terminal of the inverter 36 so that the inverter 36 outputs a low level signal. When the accelerator pedal switch 26 is opened, zero or no voltage is applied to the input terminal of the inverter 36 so that the inverter 36 outputs a high level signal.

The auxiliary control unit 30 includes a driver or D.C. amplifier 40 and an AND gate 42. The first input terminal of the AND gate 42 is connected to the output terminal of the inverter 36. The second input terminal of the AND gate 42 is connected, via an auxiliary-device ON/OFF switch 44 included in the signalling section 32, to a terminal 46 to which the fixed positive voltage +V is applied. The output terminal of the AND gate 42 is connected to the input terminal of the driver 40. The output terminal of the driver 40 is electrically connected to the electromagnetic clutch 24 to energize the latter. In the case where the inverter 36 outputs a high level signal to the first input terminal of the AND gate 42, when the ON/OFF switch 44 is closed, a high level signal is applied to the second input terminal of the AND gate 42 via the terminal 46 and the ON/OFF switch 44 so that the AND gate 42 outputs a high level signal to the driver 40. The high level signal fed to the driver 40 causes the driver 40 to supply an electric power to the electromagnetic clutch 24 to energize the latter. In the similar case, when the ON/OFF switch 44 is opened, a low or zero level signal is applied to the second input terminal of the AND gate 42 so that the AND gate 42 outputs a low or zero level signal to the driver 40. The low or zero level signal fed to the driver 40 causes the driver 40 to supply no electric power to the electromagnetic clutch 24 to de-energize the latter. In the case where the inverter 36 outputs a low level signal to the first input terminal of the AND gate 42, since the AND gate 42 remains forcedly closed, the AND gate 42 outputs a low or zero level signal to the driver 40 so that the electromagnetic clutch 24 remains de-energized regardless of closing of the ON/OFF switch 44.

The auxiliary-device ON/OFF switch 44 included in the signalling section 32 is designed so as to be operated manually and/or operated by a temperature-responsive device or thermostat sensing the temperature of the air-conditioned space in the case where the auxiliary device 20 consists of the air-conditioner compressor.

In operation, when the power output required of the engine 10 or the engine load is relatively small so that the accelerator pedal switch 26 is opened, the electromagnetic clutch 18 is de-energized via the driver 34 and the inverter 36 outputs a high level signal to the AND gate 42. De-energizing the electromagnetic clutch 18 interrupts the transmission of the driving force from the engine 10 to the compressor 14, so that the compressor 14 is suspended and the engine load is thus reduced by an amount resulting from the suspension of the compressor 14. The high level signal fed from the inverter 36 to the AND gate 42 allows the electromagnetic clutch 24 to be energized and de-energized via the driver 40 when the ON/OFF switch 44 is closed and opened, respectively. Energizing the electromagnetic clutch 24 effects the transmission of the driving force from the engine 10 to the auxiliary device 20, so that the auxiliary device 20 is actuated. De-energizing the electromagnetic clutch 24 interrupts the transmission of the driving force from the engine 10 to the auxiliary device 20, so that the auxiliary device 20 is suspended.

When the accelerator pedal is depressed to increase the power output of the engine 10 to such an extent that the accelerator pedal switch 26 is closed, the electromagnetic clutch 18 is energized by the driver 34 and the inverter 36 outputs a low level signal to the AND gate 42. Energizing the electromagnetic clutch 18 effects the transmission of the driving force from the engine 10 to the compressor 14, so that the compressor 14 starts to operate to facilitate increases in the power output of the engine 10 due to supercharging. The low level signal fed from the inverter 36 to the AND gate 42 causes the electromagnetic clutch 24 to be de-energized via the driver 40 even in the case where the ON/OFF switch 44 is closed. De-energizing the electromagnetic clutch 24 interrupts the transmission of the driving force from the engine 10 to the auxiliary device 20, so that the auxiliary device 20 is suspended. The suspension of the auxiliary device 20 reduces the engine load and concurrently increases the power received by the compressor 14 from the engine 10, enhancing the effect of the compressor 14 and speeding up increases in the power output of the engine 10. Thus, the power output of the engine 10 can be increased more quickly.

It should be noted that the crankshaft 10A of the engine 10 is also connected to a main load, such as a vehicle, to drive the latter.

Figure 4:
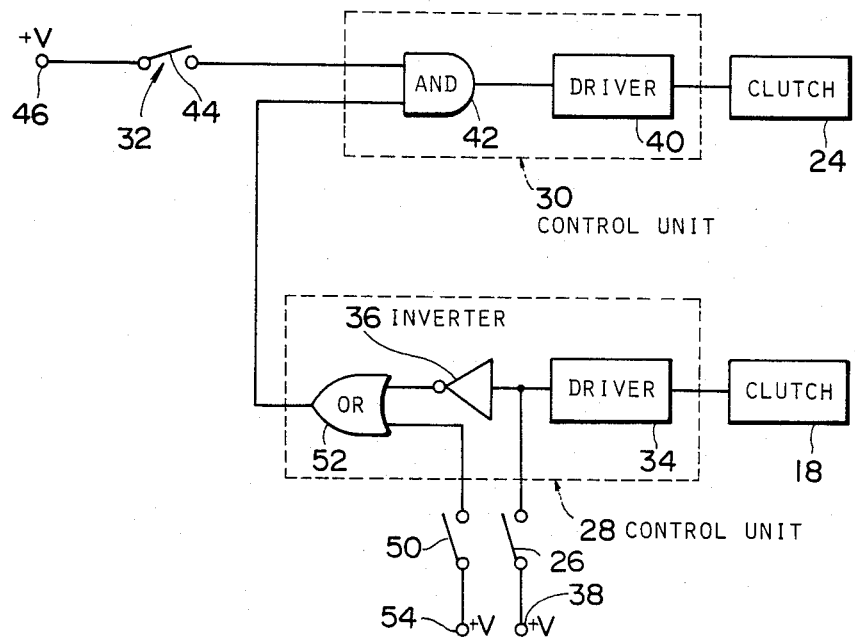
FIG. 4 is a diagram of the electrical components of the supercharger of FIG. 3.
Figure 3:
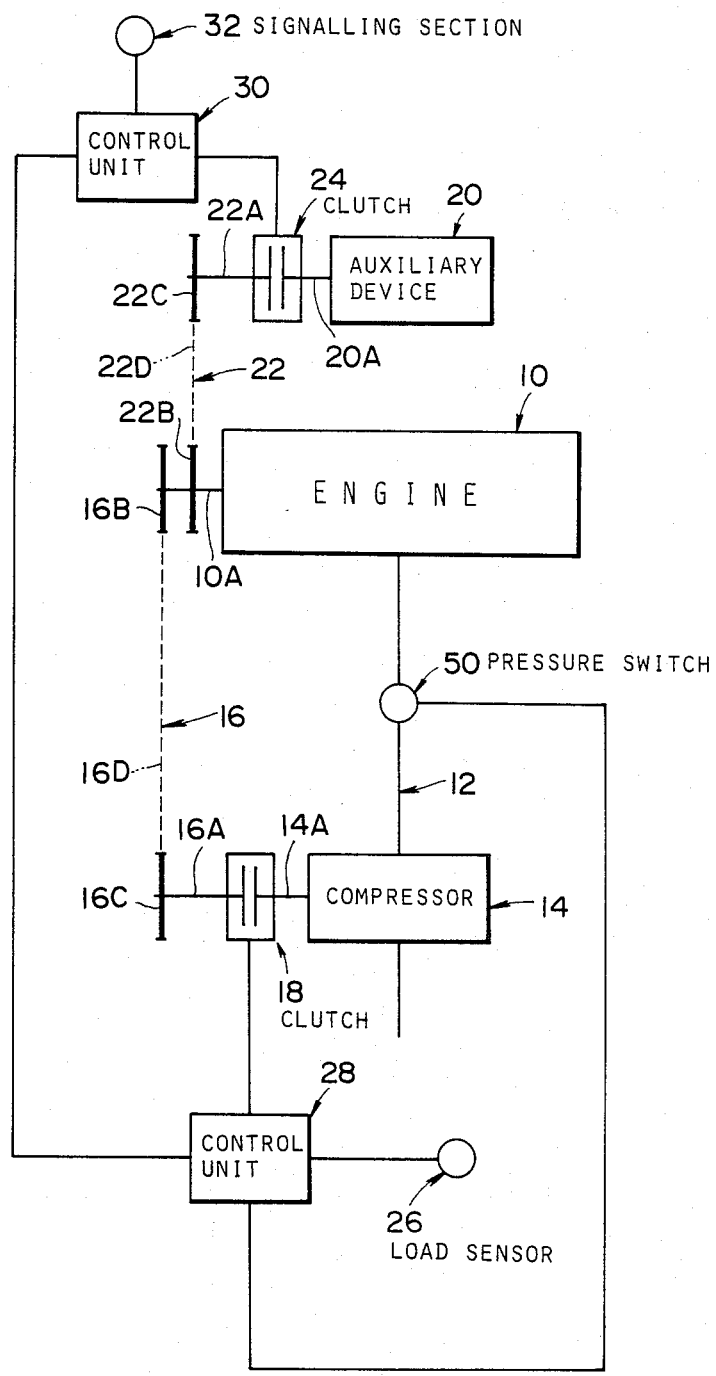
FIG. 3 is a diagram of a supercharger for an internal combustion engine according to a second embodiment of this invention.

FIGS. 3 and 4 show a second embodiment of this invention, which is designed in a manner similar to that of the first embodiment of this invention except for the following points. The second embodiment includes a pressure-responsive switch 50 disposed in such a manner as to sense the pressure in the air passage 12 downstream of the compressor 14 representing the condition of supercharging. The pressure switch 50 is designed so as to be closed when the pressure in the air passage 12 downstream of the compressor 14 is higher than a predetermined level representing acceptable supercharging and be opened otherwise.

The main control unit 28 further includes an OR gate 52, which is disposed in the connection between the inverter 36 and the AND gate 42 so that output from the inverter 36 is transmitted to the AND gate via the OR gate 52. The first input terminal of the OR gate 52 is connected to the output terminal of the inverter 36. The second input terminal of the OR gate 52 is connected, via the pressure switch 50, to a terminal 54 to which the fixed positive voltage +V is applied. In the case where the inverter 36 outputs a low level signal to the OR gate 52, when the pressure switch 50 is closed, a high level signal is applied to the first input terminal of the AND gate 42 via the terminal 54 and the pressure switch 50, so that the AND gate 42 operates in a way similar to when the inverter 36 outputs a high level signal in the first embodiment. In the similar case, when the pressure switch 50 is opened, a low level signal is applied to the first input terminal of the AND gate 42, so that the AND gate 42 operates in a way similar to when the inverter 36 outputs a low level signal in the first embodiment.

As soon as the pressure in the air passage 12 downstream of the compressor 14 exceeds the predetermined level after the compressor 14 has started to operate, the pressure switch 50 is closed so that the electromagnetic clutch 24 can be energized by closing the ON/OFF switch 44 regardless of the fact that the inverter 36 outputs a low level signal to the OR gate 52. In this case, the auxiliary device 20 can thus be actuated by controlling the ON/OFF switch 44. In this way, the auxiliary device 20, after having suspended simultaneously with start of the compressor 14, can operate again when the power output of the engine 10 or the engine load so increases that the pressure in the air passage 12 downstream of the compressor 14 exceeds the predetermined level. As a result, this second embodiment increases the range of conditions under which the auxiliary device 20 is operable. Since a level of pressure in the air passage 12 downstream of the compressor 14 higher than the predetermined level represents the attainment of a roughly steady level of engine power, making the auxiliary device 20 operable via the pressure switch 50 does not degrade the engine response characteristics.

An electrically-controllable switch may be used instead of the pressure switch 50. In this case, a timer cooperating with the accelerator pedal switch 26 is necessary to control the electrically-controllable switch. The combination of the timer and the electrically-controllable switch is designed so that the electrically-controllable switch is closed a preset time after the accelerator pedal switch 26 has been closed. The timer must be reset when the accelerator pedal switch 26 is opened. This arrangement is effective in the case where the accelerator pedal switch 26 remains closed for a relatively long time, since the auxiliary device 20 becomes operable again the preset time after the accelerator pedal switch 26 is closed.

It should be understood that further modifications and variations may be made in this invention without departing from the spirit and scope of this invention as set forth in the appended claims.

What is claimed is:

1. A supercharger for the combination of an engine, an air intake passage through which air is conducted to the engine, and an auxiliary device connectable to the engine to be driven by the engine; comprising:
   (a) a compressor disposed in the air intake passage for compressing air conducted to the engine, the compressor being connectable to the engine to be driven by the engine;
   (b) first means for sensing whether or not the power output required of the engine is higher than a predetermined level;
   (c) second means responsive to the first means for disconnecting the compressor from the engine when the power output required of the engine is not higher than the predetermined level;
   (d) third means responsive to the first means for disconnecting the auxiliary device from the engine when the power output required of the engine is higher than the predetermined level;
   (e) fourth means for sensing whether or not the pressure in the air intake passage downstream of the compressor is higher than a predetermined value; and (f) fifth means, being responsive to the fourth means, for disabling the disconnection of the auxiliary device from the engine by the third means and thus establishing the connection of the auxiliary device to the engine when the pressure in the air intake passage downstream of the compressor is higher than the predetermined value.

2. A supercharger as recited in claim 1, wherein the third means comprises:
 (a) an electromagnetic clutch for disconnecting the auxiliary device from the engine when de-energized; and
 (b) means for de-energizing the clutch when the power output required of the engine is higher than the predetermined level.

* * * * *